Oct. 1, 1935.  E. PRITCHETT  2,016,049

ANIMAL TRAP

Filed June 20, 1934  2 Sheets-Sheet 1

Inventor

E. Pritchett

By Clarence A. O'Brien
Attorney

Oct. 1, 1935.  E. PRITCHETT  2,016,049
ANIMAL TRAP
Filed June 20, 1934  2 Sheets-Sheet 2
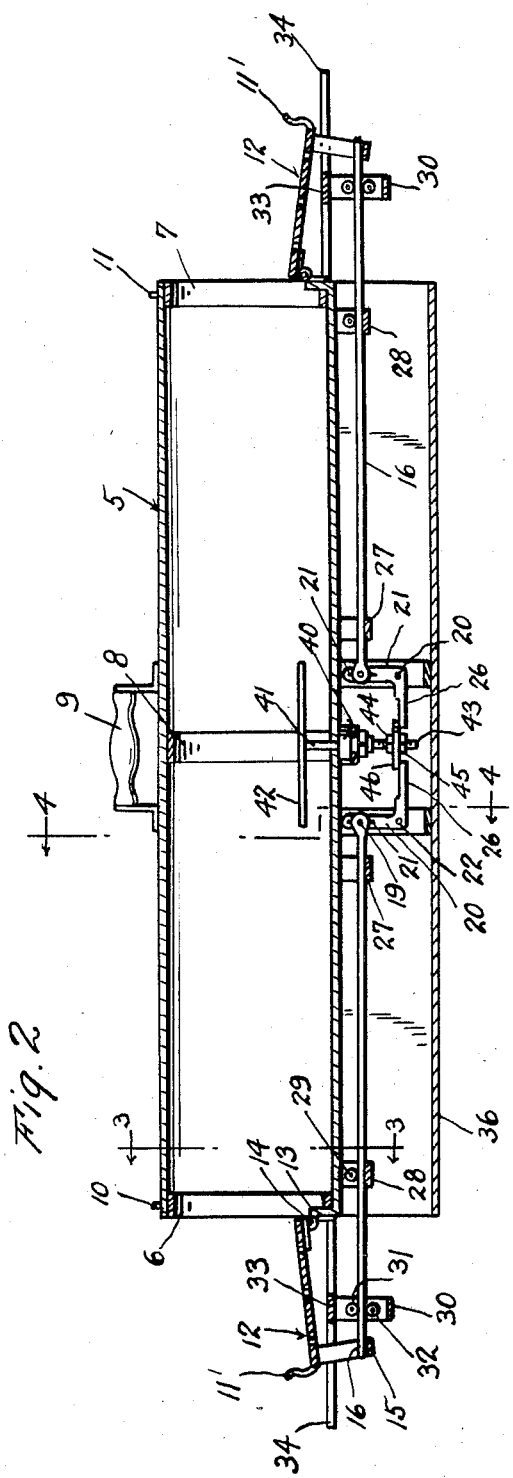
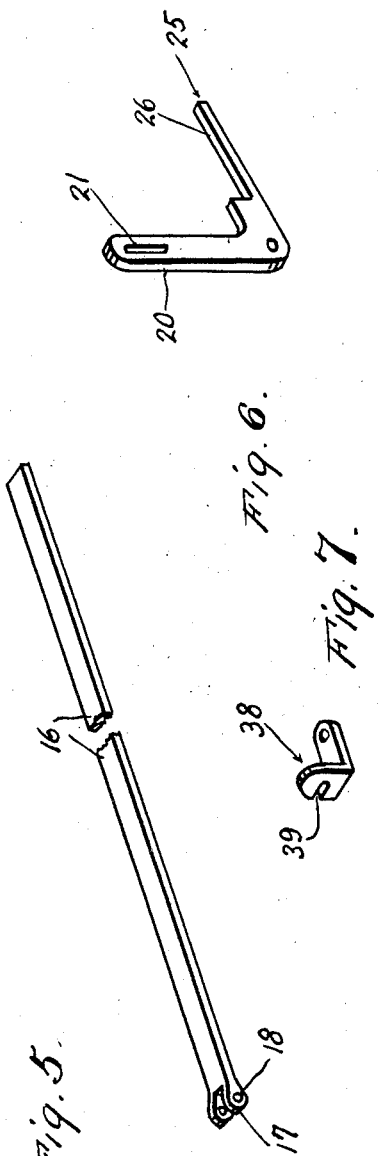
Inventor
E. Pritchett
By Clarence A. O'Brien
Attorney Patented Oct. 1, 1935

2,016,049

UNITED STATES PATENT OFFICE 2,016,049

ANIMAL TRAP

Elbert Pritchett, Grayville, Ill.

Application June 20, 1934, Serial No. 731,541

1 Claim. (Cl. 43—61)

My invention relates generally to animal traps, and particularly to traps for taking small animals and retaining them without injury to the animals, and an important object of my invention is to provide a trap of this character which may be mounted on land or in the water, and which is capable of being easily camouflaged.

It is also an important object of my invention to provide a low cost, light weight trap of the type indicated from which a trapped animal may be easily released without injury to the animal, the said trap being readily portable and taking up a comparatively small space.

Other objects and advantages of my invention will be apparent from a reading of the following description in connection with the drawings, wherein for purposes of illustration I have shown a preferred embodiment of my invention.

In the drawings:—

Figure 2 is a longitudinal vertical sectional view through Figure 1 taken approximately on the line 2—2 and looking in the direction of the arrows.

Figure 5 is a perspective view of one of the latches.

Figure 6 is a perspective view of one of the triggers.

Figure 7 is a perspective view of a catch.

Figure 1:
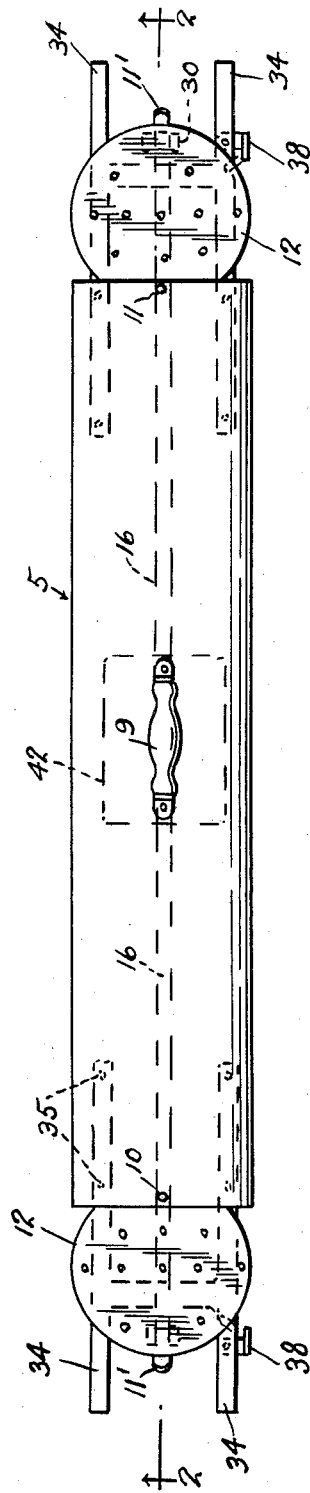
Figure 1 is a top plan view of the embodiment showing the doors open.
Figure 4:
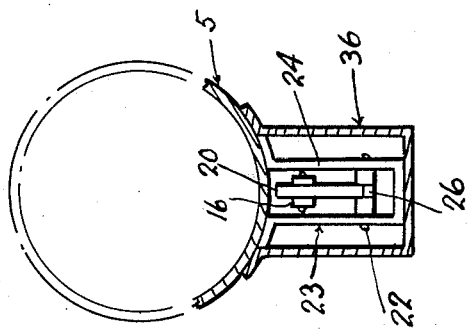
Figure 4 is a transverse vertical sectional view taken through Figure 2 approximately on the line 4—4 and looking in the direction of the arrows.
Figure 3:
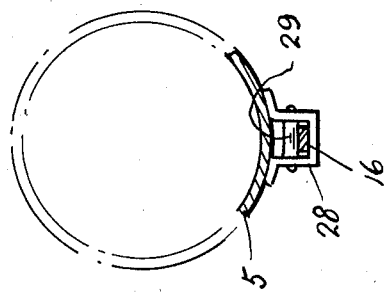
Figure 3 is a transverse vertical sectional view taken through Figure 2 approximately on the line 3—3 and looking in the direction of the arrows.

Referring in detail to the drawings, the numeral 5 refers generally to an elongated cylindrical casing which has at each end thereof an interior brace band 6, 7, respectively, and also a central brace band 8, and a carrying handle 9 attached to the exterior of the top thereof. On the top of each end of the cylinder is a boss 10, 11 with which coacts a spring tongue 11' on the door 12, the engagement of these parts as the door closes, automatically locking the door closed so as to prevent escape from the cylinder of the animal therein which has sprung the trap. Since both ends of the trap and both doors thereof and both trigger mechanisms are similar in construction and arrangement, the description of one will suffice for the description of the other.

A flange 13 on the lower part of the end of the cylinder has a hinge 14 attached thereto, the hinge 14 involving some form of conventional spring arrangement tending to close the door, and the hinge is connected to the lower part of the circular door 12 so as to condition the same to open in the manner indicated in Figure 2 and to close into closure relation to the respective end of the cylinder.

The door 12 has on its outer side a U-shaped receiver 15 with which is adapted to be engaged the outer end of the latch 16 while the trap is in the set position. The latch 16 is an elongated flat bar having a clevis formation 17 at its inner end through holes 18 in the arms of which is passed a pivot pin 19 which passes through the slot 21 in the L-shaped trigger 20 through the elbow of which passes a pivot 22 whose ends are mounted in the vertical arms 24 of the U-shaped brackets 23. The lower arm 25 of the trigger 20 has its upper side reduced as indicated at 26.

A U-shaped retainer 27 supports the inward part of the latch 16 and is fixed to the underside of the cylinder. Slidably supporting the outer part of the latch 16 is the retainer 28 having the roller 29 journaled therein and the outer retainer 30 which has rollers 31, 32 engaging the upper and lower sides of the latch, the retainer 30 being mounted on and depending from cross members 33 fixed between the arms 34 of the door support, these arms being riveted or otherwise suitably secured to the underside of the cylinder by the means indicated by the numerals 35. It will be obvious that the engagement of the outer ends of the latches 16 with the receivers 15 will hold the doors 12 in the open position shown in Figure 2 against the tension of the spring hinges, and that when the latches 16 are drawn inwardly when the trap is sprung, the doors will be released to swing upwardly to the closed position and lock themselves by effecting engagement of their spring portions 11' thereof with the corresponding ones of the bosses 10, 11. It is also obvious that both of the doors close simultaneously so as to prevent escape of the animal from either end of the cylinder.

An elongated narrow pan 36 encloses the sides and the bottom of the cylinder. Openings being provided at the ends of the pan for the latches 16 to pass through. Pivoted on one of the arms 34 of the door supports is the L-shaped catch 38 which has in one side of one arm thereof the notch 39 which may be engaged with the respective door by swinging the catch on its pivot, so as to hold the door or doors open while resetting and baiting the trap, and before setting the latches into engagement with the receivers. When the mechanism of the trap has been set, the catches 38 will be released from engagement with the doors so that the doors may operate closed when the trap is sprung.

A housing generally designated 40 is fixed to the underside of the cylinder at the center thereof and vertically slidable therethrough is the rod 41 which has on its upper end the rectangular platform 42 and adjacent its lower end the threaded portion 43 carrying nuts 44 and 45 engaging opposite sides of the trigger plate 46, the nuts being arranged to enable adjusting the trigger plate 46 up or down on the rod 41. The reduced portions 26 of the triggers 20 engage the underside of the trigger plate 46 and hold the platform 42 in the elevated set position when the triggers are in the position shown in Figure 2, which is the set position of the trap.

The bait is suspended from the top of the cylinder over the platform 42 or is placed directly on the platform 42, in such a position that it will be necessary for the animal to rest a part of its weight upon the platform 42 after entering either end of the trap in order to reach the bait.

The triggers 20 and the arrangement thereof with respect to the latches, and the roller mounting of the latches and the manner of engagement of the latches with the receivers on the doors, is such that only a slight weight on the platform 42 is required to depress the same sufficiently to rock the triggers and withdraw the latches from the receivers on the doors, and permit the spring hinges of the doors to close and lock the doors. Since the animal in the act of springing the trap will be in a position remote from the doors, it is obvious that no injury to the animal can take place due to the springing of the trap.

When it is desired to re-set the trap, the doors are opened, and the catches 38 engaged therewith, and then the trap is re-baited, if necessary, and then the platform 42 is elevated and the triggers and latches pushed back to the positions shown in Figure 2.

Although I have shown and described herein a preferred embodiment of my invention, it is to be definitely understood that I do not desire to limit the application of the invention thereto, and any change or changes may be made in materials and in structure and arrangement of parts, within the spirit of the invention and the scope of the subjoined claim.

What is claimed is:—

A trap of the character described, comprising a casing having a pair of openings, a spring-closed door pivotally mounted on the lower portion of each end of the casing and opening outwardly, a U-shaped catch on the outer side of each door adjacent the upper portions thereof, spaced guides on the lower portion of said casing, slidable latches in said guides, the outer ends being engageable with the U-shaped members when the doors are in their lowermost position and the latches in their outer position, pivotally mounted cams associated with the inner ends of said latches, for removing the latches into and out of engagement with the U-shaped members on the doors, and a movable member within the casing adapted to be operated by an animal passing into said casing through one of the openings, and an operative connection between the cams and the movable member for actuating said cams upon movement of the movable member.

ELBERT PRITCHETT.